United States Patent [19]

Donomoto et al.

[11] Patent Number: 4,798,770

[45] Date of Patent: Jan. 17, 1989

[54] HEAT RESISTING AND INSULATING LIGHT ALLOY ARTICLES AND METHOD OF MANUFACTURE

[75] Inventors: Tadashi Donomoto; Mototsugu Koyama; Masaaki Nagaoka, all of Toyota, Japan

[73] Assignee: Toyota Jidosha Kabushiki Kaisha, Toyota, Japan

[21] Appl. No.: 119,238

[22] Filed: Nov. 6, 1987

Related U.S. Application Data

[63] Continuation of Ser. No. 850,421, Apr. 7, 1986, abandoned, which is a continuation of Ser. No. 706,253, Feb. 28, 1985, abandoned, which is a continuation of Ser. No. 419,478, Sep. 17, 1982, abandoned.

[30] Foreign Application Priority Data

Sep. 24, 1981 [JP] Japan ............................... 56-151564

[51] Int. Cl.[4] .......................... B22F 3/26; B23P 17/00

[52] U.S. Cl. .................................. 428/547; 29/527.5; 92/212; 92/223; 92/224; 92/248; 123/193 P; 428/553

[58] Field of Search ................... 29/156.4 R, 156.5 R, 29/525, 527.3, 527.5, 190, 176; 92/212, 213, 216, 222, 223, 224, 230, 234, 238, 248, 254; 123/668, 669, 193 P, 193 CP; 428/547

[56] References Cited

U.S. PATENT DOCUMENTS

| | | | |
|---|---|---|---|
| 1,755,711 | 4/1930 | Soulis | 29/156.5 R |
| 2,657,961 | 11/1953 | Von Lassberg | 92/212 |
| 3,149,409 | 9/1964 | Maruhn | 29/156.5 R |
| 3,911,891 | 10/1975 | Dowell | 92/223 |
| 4,306,489 | 12/1981 | Driver et al. | 92/212 |
| 4,404,262 | 9/1983 | Watmough | 29/156.5 R |
| 4,612,256 | 9/1986 | NeuHäuser et al. | |

FOREIGN PATENT DOCUMENTS

| | | | |
|---|---|---|---|
| 27782 | 4/1981 | European Pat. Off. | 123/193 P |
| 2648034 | 4/1978 | Fed. Rep. of Germany | 123/193 P |
| 846106 | 9/1939 | France | 123/193 P |
| 2092709 | 8/1982 | United Kingdom | 123/193 P |

*Primary Examiner*—Howard N. Goldberg
*Assistant Examiner*—Carl J. Arbes
*Attorney, Agent, or Firm*—Oblon, Fisher, Spivak, McClelland & Maier

[57] ABSTRACT

Light alloy articles comprising a body of light alloy having a composite fiber/light alloy layer, a sprayed heat-resistant alloy layer, and a sprayed ceramic base layer formed on the body in this sequence exhibit improved heat resistance and insulation and are very useful in the manufacture of internal combustion engine pistons. A method for producing such a coated light alloy article by spraying is also provided.

14 Claims, 2 Drawing Sheets

HEAT RESISTING AND INSULATING LIGHT ALLOY ARTICLES AND METHOD OF MANUFACTURE

This application is a continuation of application Ser. No. 06/850,421, filed Apr. 7, 1987, now abandoned, which in turn, is a continuation of application Ser. No. 06/706,253, filed Feb. 28, 1985, now abandoned, which in turn, is a continuation of application Ser. No. 06/419,478, filed Sept. 17, 1982 now abandoned.

BACKGROUND OF THE INVENTION

This invention relates to improved light alloy articles having a heat resisting and insulating surface layer and adapted for use as automobile parts such as internal combustion engine pistons and combustion chamber-defining cylinder heads; and a method for manufacturing the same.

As is well known in the art, the so-called light alloys such as aluminum alloys and magnesium alloys are characterized by their light weight and good heat conduction, and have been widely used in the manufacture of members and parts which need such properties. These light alloys, however, are undesirable for the manufacture of those parts which are subject to elevated temperatures because the light alloys themselves have a low melting temperature and poor heat resistance. These light alloys are also unsuitable for the manufacture of those parts which are required to be heat insulating because their heat conduction suggests, on the other hand, that they are poor heat insulators. To eliminate these shortcomings in order that light alloys may be used in the manufacture of those parts which require heat resistance and insulation as well as light weight, for example, internal combustion engine pistons and combustion chamber-defining cylinder heads, attempts have heretofore been made to provide a light alloy body with a heat resisting and insulating layer on its surface. For the manufacture of internal combustion engine pistons, for example, a light-weight aluminum or magnesium alloy is used as a base for the piston and a coating material having high heat resistance as well as low heat conductivity, such as ceramic and refractory metal is applied to a head portion of the piston, thereby preventing the melting- or burning-away of the head portion as well as reducing thermal loads to the piston and associated piston rings and cylinder. Such heat resisting and insulating piston heads recently become of more interest from a standpoint of improving combustion efficiency or the like.

The previously proposed methods for applying a heat-resisting and -insulating surface layer to a head portion of a piston body made of light alloy such as aluminum and magnesium alloys are generally classified into the following three types. The first method is by preforming a ceramic material or a refractory metal such as a Nb base alloy, W base alloy and Mo base alloy, and joining the preform to a piston body of light alloy by mechanical fastening (e.g., bolt fastening and crimping) or welding. The second method uses insert casting process by which a ceramic material or refractory metal is integrated with a piston body of light alloy. The third method is based on surface coating techniques including metallization or spraying, anodization and electrodeposition. A head portion of a light alloy piston body may be coated with a ceramic material or refractory metal by any of these techniques.

In providing the piston head portion with a surface layer for heat resistance and insulation, important are the following factors: (1) light weight, or no sacrifice of the light weight of the piston body, (2) high heat resistance and insulation, (3) high durability, or prevention of the surface layer from cracking or peeling from the piston body, (4) ease of manufacture, and (5) low cost. However, none of the above-mentioned conventional methods have succeeded in fully satisfying these requirements. More specifically, in the first or second method, a refractory metal having a coefficient of thermal expansion approximating to that of the light alloy of which the piston body is made may be selected and it can be joined to the light alloy more firmly than ceramic materials are, leading to an advantage in durability. However, since the refractory metal is poorer in heat insulation and fire resistance than ceramic material, the refractory metal layer must be increased in thickness. The increased thickness of the refractory metal layer along with the considerably higher specific gravity of refractory metal itself than the bulk specific gravity of ceramic material results in an undesirable increase in weight of the piston. On the other hand, when ceramic materials are used in the first or second method, some advantages are obtained including light weight, heat insulation and fire resistance. However, because of their coefficient of thermal expansion significantly different from those of light alloys such as aluminum and magnesium alloys, the ceramic materials are susceptible to cracking or failure during service. The use of ceramic materials thus encounters some difficulty in forming a durable ceramic cover. Durability may be improved only at the sacrifice of cost. Furthermore, finishing of the ceramic material to a predetermined shape further increases the cost because of its poor processability.

The third method, that is, surface coating method also suffers from serious problems. Coatings resulting from anodization or electrodeposition can be at most 0.1 mm in thickness, which is too thin to provide sufficient heat insulation and fire resistance. The spraying or metallizing involved in the third method allows coatings to be increased in thickness in comparison with the other surface coating techniques, for example, up to as thick as 2 mm. Thicknesses of such an order are still insufficient to achieve practically acceptable heat insulation and resistance when metallic materials are used. Ceramic base materials should be selected for this reason. Because of its difference in coefficient of thermal expansion from the light alloy of which the piston body is made, the ceramic coating is susceptible to cracking and peeling during service as in the above-mentioned case, leaving a durability problem. As a countermeasure, it is known to spray a certain metal to the surface of a light alloy piston body to form an intermediate layer, the metal having high heat resistance and a coefficient of thermal expansion intermediate that of the light alloy and a ceramic material to be subsequently sprayed, for example, Ni-Cr alloy, Ni-Cr-Al alloy, and Ni-Cr-Al-Y alloy. A ceramic material is then sprayed onto the intermediate layer such that the intermediate layer may compensate for a difference in thermal expansion between the overlying ceramic layer and the underlying light alloy piston body. Since the intermediate layer generally has a thickness of 100 μm or less, it is insufficient to absorb the thermal expansion and contraction of the piston body. There still remains unsolved a durability problem.

Therefore, an object of the present invention is to provide improved light alloy articles which take advantage of the inherent light weight of light alloys themselves, have excellent heat resistance, heat insulation and durability, and can be produced less costly in high yields. Another object of the present invention is to provide a method for producing such improved light alloy articles.

SUMMARY OF THE INVENTION

According to a first aspect of this invention, there is provided a light alloy article comprising a body of a light alloy such as an aluminum alloy and magnesium alloy; a composite fiber/light alloy layer made essentially of the same light alloy as the light alloy of which the body is made and heat-resistant fibers having a lower heat conductivity than the light alloy, such as inorganic fibers and metallic fibers, the fibers being integrally bonded by the light alloy; a first sprayed layer of a heat-resisting alloy such as a Ni-Cr alloy; and a second sprayed layer of a ceramic base material; these layers being formed on the body in this sequence. The heat-resisting alloy of which the first layer is made is, in coefficient of thermal expansion, higher than the ceramic material of the second layer and lower than the composite fiber/light alloy layer. Among these layers, the second sprayed layer of ceramic base material mainly serves for heat resistance and insulation in an atmosphere at elevated temperatures, and the composite layer and the first sprayed layer between the second sprayed layer and the light alloy body mainly serve to compensate for thermal expansion and contraction.

According to a second aspect of this invention, there is provided a method for producing a heat resisting and insulating light-alloy article comprising the steps of placing a preform of heat-resistant fibers at a given position in a cavity of a mold, pouring a molten light alloy into the mold cavity, subjecting the molten light alloy in the mold cavity to liquid metal forging thereby causing the light alloy to fill up the space among the fibers of the preform, allowing the light alloy to solidify to form a block of the light alloy having a composite fiber/light alloy layer integrated on its surface, removing the block from the mold, spraying a heat-resisting alloy onto the composite fiber/light alloy layer on the block, and further spraying a ceramic base material onto the sprayed layer of the heat-resisting alloy.

BRIEF DESCRIPTION OF THE DRAWINGS

The above and other objects, features and advantages of this invention will be more fully understood from the following description taken in conjunction with the accompanying drawings. It is to be understood, however, that the embodiments are for purpose of illustration only and are not construed as limiting the scope of the invention.

DESCRIPTION OF THE PREFERRED EMBODIMENTS

Figure 1:
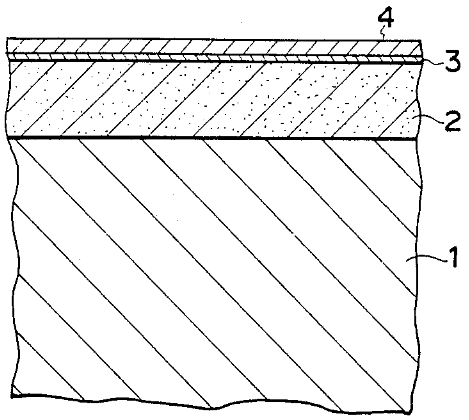
FIG. 1 is a schematic cross-sectional view of one embodiment of the light alloy article according to this invention.

Referring to FIG. 1, one embodiment of the light alloy article according to this invention is shown which comprises a base or body 1 made of a light alloy such as an aluminum or magnesium alloy. On the body 1, a composite fiber/light alloy layer 2 is formed adjacent the surface of the body which is made, in integrated form, of heat-resistant fibers such as inorganic fibers or metallic fibers and a light alloy of the same type as the light alloy of which the body 1 is made. A first sprayed layer 3 of a heat-resisting alloy is present on the composite layer 2, and a second sprayed layer 4 of a ceramic base material is present on the heat-resisting alloy layer 3.

The body 1 and the layers 2, 3 and 4 will be described in detail. The body 1 may be made of any desired one of well-known light alloys such as aluminum alloys and magnesium alloys as long as it meets the requirements for the body. Since the light alloys used for the body 1 and for the composite layer 2 are of the same type, the light alloy selected may desirably be highly compatible with the fibers used for the composite layer 2.

The composite fiber/light alloy layer 2 is made of a composite material of heat-resistant fibers such as inorganic fibers and metallic fibers to be described later, and a light alloy of the same type as the light alloy of which the body 1 is made, the fibers being integrally or firmly bonded by the light alloy. The fibers selected should have a lower coefficient of thermal expansion than the light alloy such that the entire composite layer 2 may exhibit a coefficient of thermal expansion lower than the light alloy body 1 and higher than the ceramic base material layer 4. It will be readily understood that the ceramic base material layer 4 exhibits a significantly lower coefficient of thermal expansion than the light alloy body 1. For example, aluminum alloys have a coefficient of thermal expansion of $20–23\times10^{-6}$/deg and magnesium alloys have a coefficient of thermal expansion of $20–26\times10^{-6}$/deg., whereas the ceramic base material layer has a coefficient of thermal expansion of $5–10\times10^{-6}$/deg. If the above-mentioned composite layer is absent between the body 1 and the ceramic base material layer 4, the expansion and contraction of the light alloy body 1 due to thermal cycling during the service of the subject article would cause the ceramic base material layer 4 to crack or peel off. The provision of the composite layer 2 having an intermediate coefficient of thermal expansion prevents the cracking and peeling of the ceramic base material layer because the composite layer 2 serves as a buffer or absorber layer capable of absorbing or compensating for thermal expansion and contraction. In order that the composite layer having an intermediate coefficient of thermal expansion fully exert its function as a buffer for thermal expansion and contraction, the composite layer should be significantly increased in thickness. Unlike the sprayed layer of heat-resisting alloy described as an intermediate layer of the prior art structure in the preamble, the composite layer according to this invention can be sufficiently increased in thickness because of its nature that fibers are bonded by the light alloy, and may preferably range from 2 mm to 30 mm in thickness.

The fibers selected for the composite fiber/light alloy layer 2 should have a lower heat conductivity than the light alloy such that the composite layer 2 as a whole may exhibit a lower coefficient of heat conductivity than the body 1 made solely of the light alloy. Conveniently, the composite layer 2 itself resultantly serves as a heat insulator.

Therefore, the heat-resistant fibers used for the composite fiber/light alloy layer 2 should have a lower coefficient of thermal expansion and may preferably have a lower heat conductivity than the light alloy. Also, the fibers may preferably be highly compatible with the light alloy. From these aspects, the fibers may desirably be selected from ceramic fibers such as $Al_2O_3$, $ZrO_2$, SiC, $Al_2O_3$-$SiO_2$, etc., glass fibers, carbon fibers, boron fibers, stainless steel fibers, SiC whiskers, $Si_3N_4$ whiskers, potassium titanate whiskers, and the like, but not limited to these examples. To enhance the compatiblity or bonding of the fibers with the light alloy, the fibers may be pretreated, for example, with a suitable material highly wettable by the molten light alloy or with the light alloy itself. The fibers used may be of any desired shape including long fibers, short fibers and whiskers.

In order that coefficient of thermal expansion may vary more progressively between the light alloy body 1 and the ceramic base material layer 4, the concentration of the fibers in the composite layer 2 may be increased from its boundary with the light alloy body 1 toward the ceramic base material. In this case, the concentration of the fibers may vary either continuously or stepwise.

The presence of fibers in too low concentrations in the composite fiber/light alloy layer will fail to provide the necessary functions of heat insulation and absorption of thermal expansion and contraction whereas increasing the concentration of fibers beyond a certain level will impose difficulty to the integral binding of fibers by light alloy. For this reason, the fibers may desirably be present in an amount of 2% to 50% by volume based on the composite fiber/light alloy layer.

The first layer 3 of heat-resisting alloy sprayed on the composite fiber/light alloy layer 2 serves not only to enhance the strength of bond between the composite layer 2 and the ceramic base material layer 4, but also to improve the heat-resistance and corrosion-resistance of the composite layer by covering its surface. In addition, the heat-resisting alloy layer 3 plays the role of buffering or absorbing thermal expansion and contraction between the light alloy body 1 and the ceramic base material layer 4, as the composite layer 2 does. Therefore, the heat-resisting alloy used for the first spray layer 3 should have a lower coefficient of thermal expansion than the composite layer 3, but higher than the ceramic base material layer 4, be heat and corrosion resistant, and have improved intimacy with the ceramic base material layer. Examples of the heat-resisting alloys include Ni-Cr alloys containing 10% to 40% of Cr, Ni-Al alloys containing 3% to 20% of Al, Ni-Cr-Al alloys containing 10% to 40% of Cr and 2% to 10% of Al, Ni-Cr-Al-Y alloys containing 10% to 40% of Cr, 2% to 10% of Al and 0.1% to 1% of Y, all percents being by weight. These alloys have a coefficient of thermal expansion of about 12 to $13\times10^{-6}$/deg. meeting the above-mentioned requirements. The heat-resisting alloy layer 3 may generally have a thickness ranging from 0.05 mm to 0.5 mm because thicknesses of less than 0.05 mm are too small to provide sufficient corrosion and heat resistance while thicknesses exceeding 0.5 mm are time-consuming to reach by spraying.

Finally, the second layer of the ceramic base material is spray coated on top of the article. The ceramic base material may either consist solely of a ceramic material or be formed from a ceramic material in combination with heat-resisting alloy as will be described later. The ceramic base material layer functions as a major layer for providing heat insulation, heat resistance and fire resistance needed for the article. The ceramic materials used should have improved high-temperature stability and corrosion resistance as well as heat insulation and resistance. Examples of the ceramic materials include oxide type ceramic compounds, such as $ZrO_2$ (including those stabilized with $Y_2O_3$, CaO, MgO, etc.), $Al_2O_3$, MgO, $Cr_2O_3$, etc. and mixtures of two or more of these compounds. These ceramic materials have a coefficient of thermal expansion of about $5-10\times10^{-6}$/deg. and a heat conductivity of about 0.005–0.03 cal./cm.sec.deg.

The ceramic base material layer 4 may be a composite layer which is obtained by concurrently spraying a ceramic material and a heat-resisting alloy of the same type as the heat-resisting alloy used for the first sprayed layer 3. Preferably, the ceramic material and the heat-resisting alloy is sprayed in such combination that the resulting layer 4 may have a major proportion of the ceramic component at the exposed surface and a major proportion of the alloy component at its interface with the underlying heat-resisting alloy layer 3. With this gradation, that portion of the ceramic base material layer 4 which is adjacent the heat-resisting alloy layer 3 exhibits a coefficient of thermal expansion equal or approximate to that of the alloy layer 3 so that coefficient of thermal expansion varies more progressively. Such progressively varying coefficient of thermal expansion effectively prevents the ceramic base material layer 4 from cracking or peeling. In this case, the ratio of the ceramic component to the heat-resisting alloy component may vary continuously or stepwise. The stepwise variation may alternatively be achieved by multi-layer coating. The ceramic base material layer 4 may preferably have a thickness ranging from 0.2 mm to 2.0 mm because thicknesses less than 0.2 mm are too small to provide sufficient heat resistance and insulation while thicknesses exceeding 0.2 mm are time-consuming to reach by spraying, resulting in reduced productivity.

The light alloy articles of the above-mentioned structure according to this invention may be produced by a variety of methods. Amcng them, the best method of manufacture is described below.

Heat-resistant inorganic or metallic fibers are previously formed into a preform having substantially the same shape and size of the composite fiber/light alloy layer of the final product. The fiber preform is then placed at a given position in a cavity of a mold which is substantially configured and sized to the configuration and size of the final product. The given position corresponds to the position of the composite layer in the final product. A molten light alloy, for example, molten aluminum or magnesium alloy is poured into the mold cavity with the preform. Liquid metal forging is effected on the molten metal poured in the mold cavity. The liquid metal forging causes the molten metal to fill up the space among the fibers of the preform. The metal in the mold is then allowed to solidify to form a block of the light alloy having a composite fiber/light alloy layer integrally formed on its surface. The block is then removed from the mold. The thus obtained block is a one-piece block consisting of a body of light alloy and a composite fiber/light alloy layer integrally and continuously joined to the body. After optional machining of the block, a heat-resisting alloy is sprayed onto the surface of the composite fiber/light alloy layer to form a sprayed heat-resisting alloy layer. Finally, a ceramic material is sprayed onto the surface of the sprayed heat-resisting alloy layer to form a ceramic base material layer, completing the light alloy article of this invention. The heat-resisting alloy and the ceramic material may be sprayed by a variety of spraying methods including gas, arc and plasma spray processes, although the plasma spray process can produce deposits with the maximum strength. As described earlier, in forming a ceramic base material layer, the ceramic material may be sprayed in combination with the heat-resisting alloy.

The above-described method is very advantageous in that the body of light alloy and the composite fiber/light alloy layer can be integrally formed and the light alloy constituting the composite layer is continuous to the light alloy constituting the body so that the maximum strength of bond is established between the composite layer and the body. The integral molding has an additional advantage of reducing the number of production steps. Further, the thickness of the composite layer may be changed simply by changing the thickness of the starting fiber preform. The composite layer can be readily formed to a sufficient thickness to act as a buffer for thermal expansion and contraction.

Examples of this invention are illustrated below as being applied to internal combustion engine pistons together with Comparative Examples.

EXAMPLE 1

Figure 2:
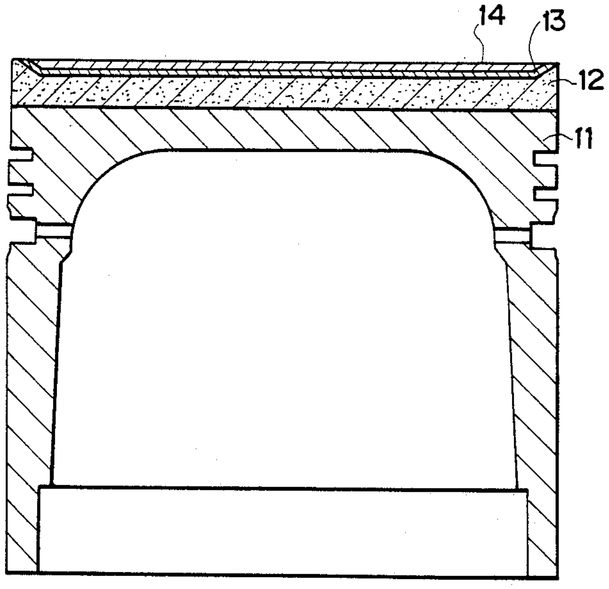
FIG. 2 is a cross section showing another embodiment of this invention applied to an internal combustion engine piston, when taken along the axis of the piston.

Short ceramic fibers having a composition of 50% Si02, an average fiber diameter of 2.5 μm, and fiber length ranging from 1 mm to 250 mm were vacuum formed into a disc-shaped preform having a diameter of 90 mm and a thickness of 10 mm. This ceramic fiber preform had fiber packing density of 0.2 $g/cm^3$. The preform was then placed at a head-corresponding position in a cavity of a liquid-metal-forging mold which is configured and sized to the desired piston. A molten metal, i.e., an aluminum alloy identified as JIS AC 8A was poured into the mold cavity and subjected to liquid metal forging to produce a piston block having a composite layer of ceramic fibers and aluminum alloy formed integrally at the head portion. The fibers occupied 8.1% by volume of the composite layer. After removal from the mold, the block is heat treated by $T_6$ treatment, and the head portion was then machined into a dish shape having a diameter of 82 mm, a depth of 0.6 mm and a corner chamfering angle of 45°. Onto this dished portion, a heat-resisting alloy powder having a composition of 80% Ni/20% Cr and a particle size of 100 to 400 mesh was plasma sprayed to form a heat-resisting alloy layer 0.1 mm thick. Subsequently, a powder of $ZrO_2$ stabilized with MgO and having a particle size of 250 to 400 mesh was plasma sprayed onto this alloy layer to form a ceramic layer of 0.6 mm thick. The entire article was mechanically rinished to a piston. The thus obtained piston is shown in the cross-sectional view of FIG. 2. The piston comprises, as shown in FIG. 2, a piston body 11 of aluminum alloy, a composite layer in the form of a composite ceramic fiber/aluminum alloy layer 12, a heat-resisting alloy layer in the form of a sprayed Ni-Cr alloy layer 13, and a ceramic base material layer in the form of a sprayed $ZrO_2$ layer 14.

Figure 3:
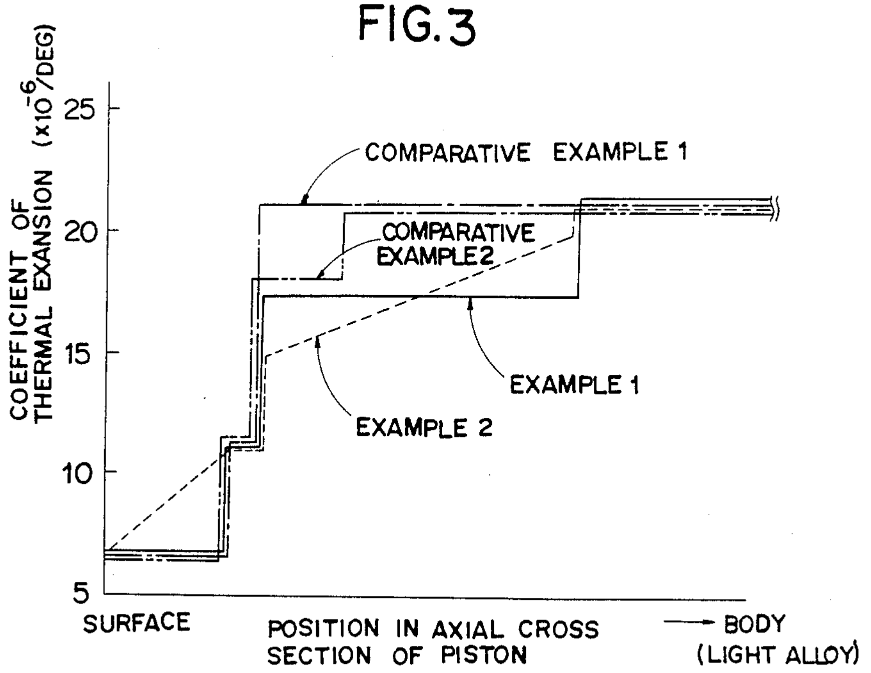
FIG. 3 is a diagram showing the coefficients of thermal expansion of the respective layers on the pistons in Examples and Comparative Examples in relation to cross-sectional positions along the piston axis.
Figure 4:
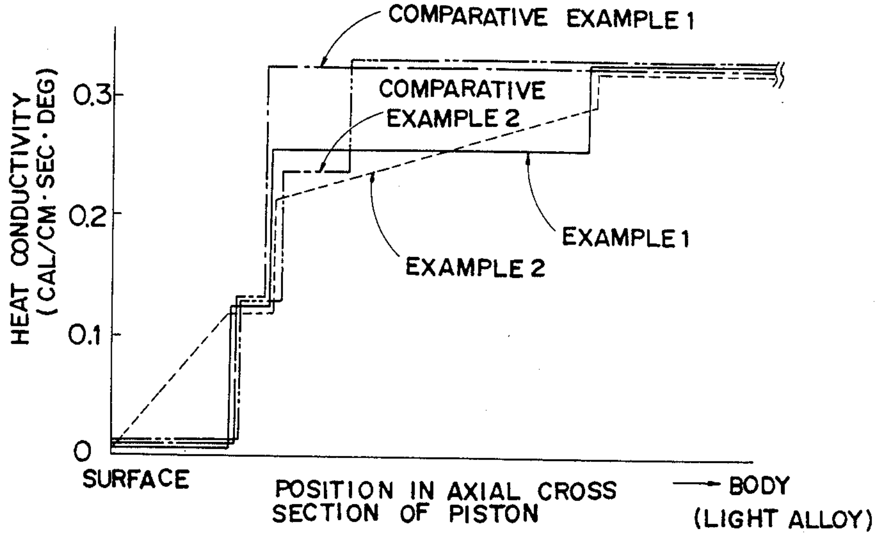
FIG. 4 is a diagram showing the heat conductivities of the respective layers on the pistons in Examples and Comparative Examples in relation to crosssectional positions along the piston axis.

The coefficients of thermal expansion of the respective layers of the piston produced in Example 1 are shown by solid lines in FIG. 3, and the heat conductivities of the respective layers are shown by solid lines in FIG. 4. These measurements of the respective layers were not derived from direct measurement of the piston, but based on a test piece which was produced under the same conditions as described in Example 1 except for shape, size and machining. As seen from FIG. 3, the coefficient of thermal expansion decreases stepwise from the body of aluminum alloy to the top-coating $ZrO_2$ layer, indicating that the resultant structure is unsusceptible to cracking or peeling due to thermal expansion and contraction. As seen from FIG. 4, the Ni-Cr alloy layer and the composite layer have a lower heat conductivity than the aluminum alloy body, indicating that both the layers function as an auxiliary layer for heat insulation.

EXAMPLE 2

A piston was produced by repeating the procedure of Example 1 except that a ceramic fiber preform whose fiber packing density continuously varied from 0.3 $g/cm^3$ at the head surface side to 0.1 $g/cm^3$ at the aluminum alloy body side such that the ratio of the fibers to the aluminum alloy might continuously vary in the composite layer, and that the ceramic base material layer was formed by plasma spraying Ni-Cr alloy and $ZrO_2$ (MgO stabilized) in controlled succession such that 100% $ZrO_2$ appeared at the head surface side and 100% Ni-Cr alloy appeared at the Ni-Cr alloy heat-resisting alloy) layer side, the ratio of $ZrO_2$ to Ni-Cr alloy continuously varying between them. The co-efficients of thermal expansion and heat conductivities of the respective layers in Example 2 are shown by broken lines in FIGS. 3 and 4, respectively. As seen from FIG. 3, the coefficients of thermal expansion of the composite layer and the ceramic base material layer continuously decrease from the aluminum alloy body side to the head surface side, indicating that buffer or absorption of thermal expansion and contraction is further improved.

COMPARATIVE EXAMPLE 1

A piston was produced by repeating the procedure of Example 1 except that the composite layer was omitted. The coefficients of thermal expansion and heat conductivities are shown by dot-and-dash lines in Figs. 3 and 4, respectively.

COMPARATIVE EXAMPLE 2

A piston was produced by repeating the procedure of Example 1 except that 18 Cr-8 Ni stainless steel was sprayed to a thickness of 1 mm instead of the composite layer. The coefficients of thermal expansion and heat conductivities are shown by double-dot-and-dash lines in FIGS. 3 and 4, respectively.

Actual test runs were performed in a Diesel engine using the pistons produced in Examples 1 and 2 and Comparative Examples 1 and 2, and a control piston which was made of an aluminum alloy and had no surface coating for heat insulation and resistance. These pistons were examined for performance and durability. More specifically, the test was conducted in a four-cylinder Diesel engine having a displacement of 2,200 cc by alternately carrying out 4,200 rpm full operation for 20 minutes and idling operation for 10 minutes over a total period of 200 hours. The temperature at the bottom of the first ring channel and the temperature of exhaust gases flowing through the exhaust port at the cylinder head were measured while the appearance of the ceramic layer on the piston head was observed. The temperature at the first ring channel bottom was determined in terms of the hardness of the tempered material, and the temperature of exhaust gases through the cylinder head port was directly measured using a thermocouple. The results are shown in Table 1.

TABLE 1

| | Temp. at first ring channel bottom | Temp. of gases through exhaust port | Appearance of ceramic layer on piston head |
|---|---|---|---|
| Example 1 | 210 | 755 | about 3% of ceramic layer peeled |
| Example 2 | 230 | 748 | no change |
| Comparative Example 1 | 255 | 735 | about 90% of ceramic layer peeled |
| Comparative Example 2 | 250 | 738 | about 80% of ceramic layer peeled |
| Control* | 270 | 730 | — |

*Ordinary piston without any heat resisting and insulating layer.

As seen from the data of Table 1, the pistons of Examples of this invention exhibit improved heat insulation and significantly improved durability as compared with those of Comparative Examples. When the piston of Example 1 is compared with Comparative Example 2, the corresponding layers have substantially equal coefficients of thermal expansion between them. A substantial, sole difference between them is that the undercoats have different thicknesses, that is, the composite layer in Example 1 has a thickness of 9.4 mm whereas the stainless steel layer in Comparative Example 2 has a thickness of 1 mm. Nevertheless, these two pistons exhibit a significant difference with respect to the durability (peel resistance) of the ceramic layer. This suggests that although the intermediate layer has an appropriate coefficient of thermal expansion, the thermal expansion and contraction are directly transferred to the overlying ceramic layer through the intermediate layer when it has a reduced thickness as in Comparative Example 2. As a result, the ceramic layer is liable to cracking and peeling. On the other hand, since the intermediate layer is a composite layer of a substantial thickness according to this invention, this intermediate layer fully functions as a buffer for the thermal expansion and contraction of the aluminum alloy body.

Although an aluminum alloy is used as the light alloy for the body and the composite layer in the abovementioned examples, it is apparent that similar results are obtained from a magnesium alloy, which has a coefficient of thermal expansion and a heat conductivity approximating to those of the aluminum alloy.

Although this invention is applied to internal combustion engine pistons in the above-mentioned examples, this invention including both the light alloy article and the method of manufacturing the same may equally be applied to various parts such as cylinder head combustion ports and turbo-charger casings.

Furthermore, the light alloy article of the invention may be used in other applications by attaching it to a given portion of another article by welding, blazing, insert casting and other bonding techniques.

The light alloy articles of the invention have many advantages. The top-coating layer of ceramic base material which is relatively light weight and highly heat resisting and insulating provides for the majority of the necessary functions of heat resistance and insulation against a high-temperature atmosphere, the article as a whole is light weight and exhibits improved heat resistance and insulation. Since the composite fiber/light metal layer and the heat resisting metal layer having intermediate coefficients of thermal expansion are present between the light alloy body and the ceramic base material layer which are significantly different in coefficient of thermal expansion, and the composite layer can be of a substantial thickness, enhanced buffering for thermal expansion and contraction is achievable to prevent the ceramic base material layer from cracking or peeling upon thermal cycling, ensuring improved durability. In addition, the presence of the heat-resisting alloy layer contributes to an improvement in corrosion resistance.

The method of the invention can produce the light alloy article with the above-mentioned advantages in a relatively simple and easy manner through a reduced number of steps. The composite fiber/light alloy layer can be easily formed to a sufficient thickness to act as a buffer for thermal expansion and contraction. The ceramic base material layer on the surface of the light alloy article can be highly durable without any extra treatment.

What is claimed is:

1. A heat-resisting and insulating light alloy article, comprising:

(a) a body of a light alloy selected from the group consisting of aluminum alloys and magnesium alloys, (b) a composite fiber/light alloy layer formed on the body, wherein the composite layer is made essentially of a light alloy of the same type as the light alloy of which the body is made and heat-resistant fibers having a lower heat conductivity than the light alloy, said fibers being integrally bonded by the light alloy and being selected from the group consisting of $Al_2O_3$ fibers, $ZrO_2$ fibers, SiC fibers, $Al_2O_3$-$SiO_2$ fiber, glass fibers, carbon fibers, boron fibers, stainless steel fibers, SiC whiskers, $Si_3N_4$ whiskers, and potassium titanate whiskers, (c) a first layer of a heat-remaining alloy sprayed onto said composite layer, which alloy is selected from the group consisting of Ni-Cr alloy, Ni-Cr-Al alloy and Ni-Cr-Al-Y alloy, and (d) a second layer of a ceramic base material sprayed onto said first layer, which material is selected from the group consisting of $ZrO_2$, $Al_2O_3$, MgO, $Cr_2O_3$, and mixtures thereof, and wherein the heat-resisting alloy, of which the first layer is made, has a thermal expansion coefficient which is higher than the ceramic material of said second layer, but lower than the composite fiber/light alloy layer.

2. The article according to claim 1 wherein the concentration of fibers in said composite fiber/light alloy layer increases continuously from its interface with the body toward the second layer.

3. The article according to claim 1 wherein the concentration of fibers in said composite fiber/light alloy layer increases stepwise from its interface with the body toward the second layer.

4. The article according to claim 1 wherein said second layer is made solely of a ceramic material.

5. The article according to claim 1 wherein said second layer is a composite layer of a ceramic material and a heat-resisting alloy of the same type as the heat-resisting alloy of which said first layer is made, said ceramic material and said heat-resisting alloy being concurrently sprayed.

6. The article according to claim 5 wherein the concentration of the ceramic material in said second layer increases continuously from its interface with said first layer to its exposed surface.

7. The article according to claim 5 wherein the concentration of the ceramic material in said second layer increases stepwise from its interface with said first layer to its exposed surface.

8. A method for producing a heat resisting and insulating light-alloy article comprising the steps of placing a preform of heat-resistant fibers at a given position in a cavity of a mold, pouring a molten light alloy into the mold cavity, subjecting the molten light alloy in the mold cavity to liquid metal forging, thereby causing the light alloy to fill up the space among the fibers of the preform allowing the light alloy to solidify to form a block of the light alloy having a composite fiber/light alloy layer integrated on its surface, removing the block from the mold, spraying a heat-resisting alloy onto the composite fiber/light alloy layer on the block, and further spraying a ceramic base material onto the sprayed layer of the heat-resisting alloy.

9. The method according to claim 8 wherein the spraying of heat-resisting alloy is carried out by plasma spraying.

10. The method according to claim 9 wherein the spraying of ceramic material is carried out by plasma spraying.

11. The method according to claim 2 wherein the spraying of ceramic material is started during the spraying of heat-resisting alloy after the heat-resisting alloy layer has reached a predetermined thickness.

12. The method according to claim 11 wherein the concurrent spraying of heat-resisting alloy and ceramic material is controlled such that the resulting heat-resisting alloy/ceramic material layer increases the concentration of ceramic material from the interface with the heat-resisting alloy layer to the exposed surface.

13. The method according to claim 1 which further comprises the step of previously forming heat-resistant fibers into the preform.

14. The method according to claim 1 wherein the preforming step is controlled such that the fiber packing density increases from one surface to the opposite surface of the preform.

* * * * *